United States Patent
Oz

(10) Patent No.: US 7,184,433 B1
(45) Date of Patent: Feb. 27, 2007

(54) SYSTEM AND METHOD FOR PROVIDING MEDIA CONTENT TO END-USERS

(75) Inventor: Ran M. Oz, Modiin (IL)

(73) Assignee: Bigband Networks, Inc., Fremont, CA (US)

(*) Notice: Subject to any disclaimer, the term of this patent is extended or adjusted under 35 U.S.C. 154(b) by 813 days.

(21) Appl. No.: 10/033,488

(22) Filed: Dec. 27, 2001

Related U.S. Application Data

(63) Continuation-in-part of application No. 09/579,551, filed on May 26, 2000, now Pat. No. 6,434,141, and a continuation-in-part of application No. 09/595,624, filed on Jun. 16, 2000.

(60) Provisional application No. 60/312,376, filed on Aug. 14, 2001.

(51) Int. Cl.
*H04L 12/28* (2006.01)
(52) U.S. Cl. ............... 370/389; 725/118; 370/392; 370/466
(58) Field of Classification Search ............ 370/466, 370/389, 392; 725/118, 109, 153, 119, 148
See application file for complete search history.

(56) References Cited

U.S. PATENT DOCUMENTS

| | | | | |
|---|---|---|---|---|
| 4,602,284 A * | 7/1986 | Kelly et al. | ............... | 380/240 |
| 5,666,487 A * | 9/1997 | Goodman et al. | .......... | 709/246 |
| 5,673,430 A * | 9/1997 | Story | ................... | 725/116 |
| 5,680,390 A * | 10/1997 | Robrock, II | ............ | 370/229 |
| 6,178,455 B1 * | 1/2001 | Schutte et al. | ............ | 709/228 |
| 6,219,355 B1 * | 4/2001 | Brodigan | ............... | 370/486 |
| 6,401,242 B1 * | 6/2002 | Eyer et al. | ................ | 725/35 |
| 6,434,141 B1 * | 8/2002 | Oz et al. | .................. | 370/352 |
| 6,785,733 B1 * | 8/2004 | Mimura et al. | ........... | 709/236 |
| 6,826,195 B1 * | 11/2004 | Nikolich et al. | ........... | 370/465 |
| 6,975,645 B1 * | 12/2005 | Suzuki et al. | ............. | 370/465 |

* cited by examiner

*Primary Examiner*—Wellington Chin
*Assistant Examiner*—Steven Blount
(74) *Attorney, Agent, or Firm*—Sonnenschein Nath & Rosenthal LLP

(57) ABSTRACT

System and method for providing media packets to users, the end users coupled to a communication network having a communication network protocol, the method includes the steps of: (a) receiving non-addressable media packets; (b) blocking media packets of non-selected media streams; (c) converting non-addressable media packets of selected media streams to addressable media packets complying with transmission parameters and with specifications of the communication network protocol; and (d) routing the addressable media packets in response to selection signals received from the users.

28 Claims, 5 Drawing Sheets

SYSTEM AND METHOD FOR PROVIDING MEDIA CONTENT TO END-USERS

RELATED APPLICATIONS

This patent application hereby claims the priority benefit of, incorporates by reference, and is a Continuation-In-Part of:

(A) U.S. patent application Ser. No. 09/579,551, filed May 26, 2000 now U.S. Pat. No. 6,434,141; and (B) U.S. patent application Ser. No. 09/595,624, filed Jun. 16, 2000.

This patent application also incorporates by reference and claims the priority benefit of U.S. Provisional Patent Application 60/312,376, filed Aug. 14, 2001 and entitled "Office Set Top Box".

FIELD OF THE INVENTION

The present invention relates to communication systems and methods in general, and to methods and systems for providing audio visual content to users, such as end users having terminals that are also coupled to a router such as an IP router. Even more particularly, the invention relates to a system and method that allow to provide media packets being conveyed over a broadband network such as a Hybrid Coax Cable network, to terminals that are coupled to a communication network such as a local area network, a data oriented network, or an IP network.

BACKGROUND OF THE INVENTION

Many end-users have terminals that are connected to data oriented communication networks. Commonly, the terminals are personal computers that are connected to a communication router via a Local Area Network (LAN). LAN is utilized to connect terminals that are located in a relatively limited geographical area, such as the terminals of a single corporation that is located at the same building.

Various communication protocols, such as the TCP/IP protocol suite, are utilized to exchange data packets from the computers, via the LAN and the router to other computers, via various IP based networks, such as but not limited to the Internet.

Various satellite networks and cable networks<such as Hybrid Fiber Coax networks, are utilized to provide media content to viewers.

Neither the router, the terminals or other components of the LAN are operable to receive media packets that are transmitted over cable networks.

Media streams that include media packets are relatively large and bandwidth consuming. Frequently, media streams cannot be provided to a terminal due to communication line limitations, such as available bandwidth and terminal processing capabilities.

There is a need for a system and method for allowing end users that are connected to data oriented networks to receive media packet being transmitted over cable and satellite network.

There is a need for a system and method for adjusting media streams such that they can be received and processed by end users.

SUMMARY OF THE PRESENT INVENTION

The invention provides a method for providing media packets to users, the users coupled to a communication network having a communication network protocol, the method includes the steps of:

(A) Receiving non-addressable media packets. The reception can include a reception of RF signals representative of media packets, a down-conversion of the RF signals to base band signals, and a de-modulation of the base band signals.

(B) Blocking media packets of non-selected media streams. The selection is usually responsive to selection signals provided by users, by users viewing patterns, by licensing schemes and the like. The selection can change dynamically during he reception of the media streams.

(C) Converting non-addressable media packets of selected media streams to addressable media packets complying with transmission parameters and with specifications of the communication network protocol. The transmission parameters may reflect an available bandwidth for transmitting addressable media packets to users, an available processing capacity of the users, but this is not necessarily so. The step of converting may include compressing media packets in response to transmission parameters. The conversion can allow multicasting of the addressable media packets in response to selection signals received from the users. The step of converting may include at least one of the following steps: multiplexing; re-multiplexing; rate adaptation; PID re-stamping; PCR re-stamping; or updating system information embedded in Transport streams. The specifications of the communication network protocol can define a format of the media packets. Commonly, the communication network protocol is selected from a group of protocols consisting of: TCP/IP, and UDP/IP.

(D) Routing the addressable media packets in response to selection signals received from the users.

The invention provides a method for displaying audio visual content to end-users, the method including the steps of: (A) receiving media stream packets from a cable communication network; (B) converting the received media stream packets to local area network compliant packets; and (C) providing the local area network compliant packets to users coupled to the local area network in response to selection signals received from the users.

The invention provides a system for providing media packets to users, the system including: (A) a receiver array for converting RF signals representative of media packets to non-addressable media packets; and (B) a broadband multimedia router, coupled between the receiver array and a communication network having a communication network protocol, for selectively converting non-addressable media packets of selected media streams to addressable media packets complying with transmission parameters and with specifications of the communication network protocol, wherein the addressable media packets are to be routed over the communication network in response to selection signals received from the users.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The disclosed technique is directed to a broadband network, which can be either wired or wireless, such as an HFC network, satellite communication and the like. The examples set forth interfaces an HFC network and hence includes specific cable related modules. For example, a network transmitter in the context of an HFC would be a QAM unit. These specific modules have to be replaced with equivalent modules, when operating on other types of broadband networks.

The following are definitions, which are used throughout the description of the disclosed technique:

DVB/ASI and DHEI are examples for digital video (MPEG) transmission specifications. The disclosed technique provides examples, which include DVB/ASI modules. It is noted that these DVB/ASI modules, can be replaced by equivalent modules, such as DHEI modules, and the like.

MPEG denotes a family of media (especially video and audio) decoding and multiplexing specifications where ISO/IEC 11172 is also called MPEG-1 and the ISO/IEC 13818 is also called MPEG-2.

Figure 1:
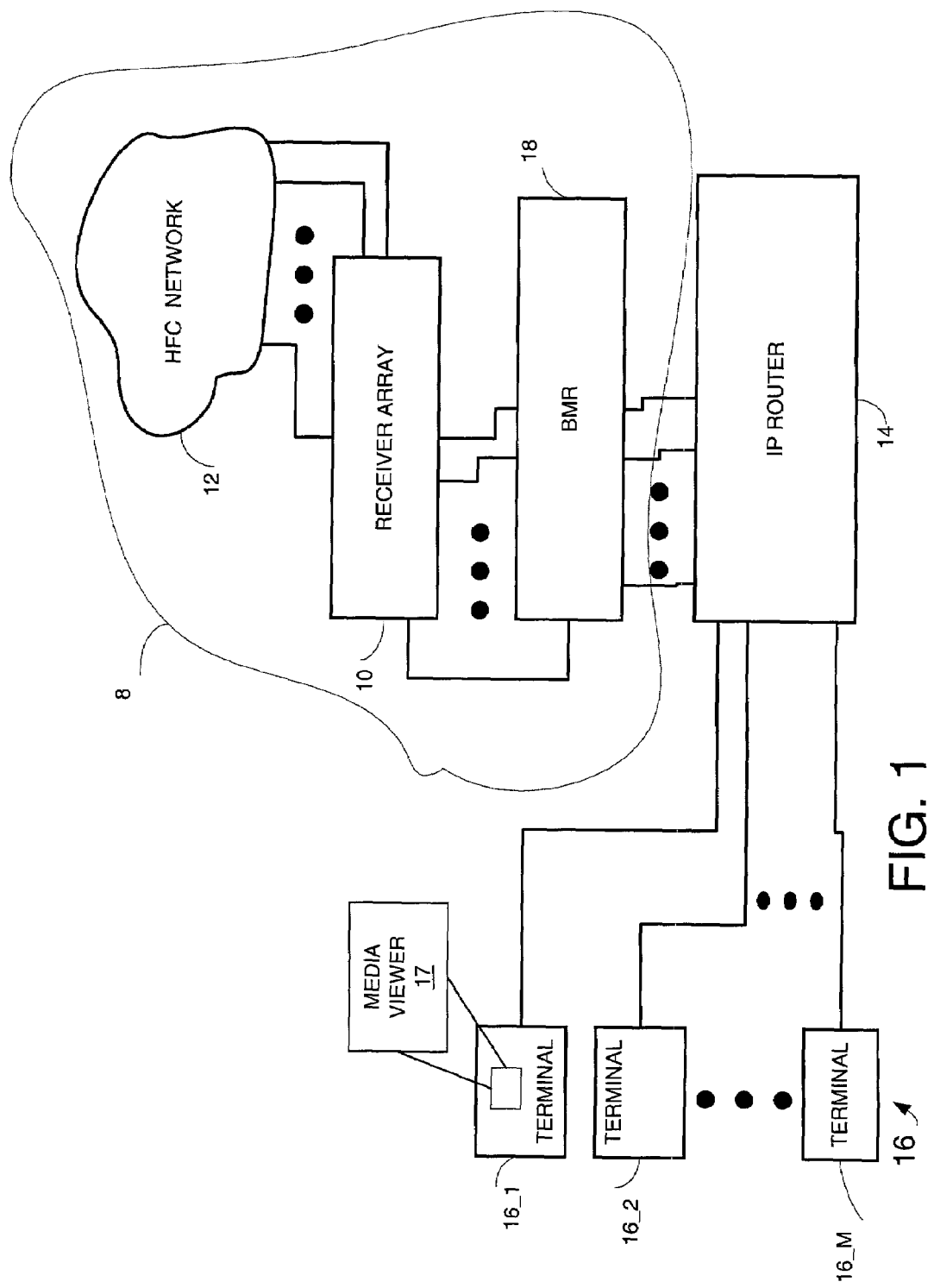
FIGS. 1 and 2 are schematic illustrations of systems for providing media content to end users, according to an embodiment of the invention.

Reference is made to FIG. 1, which is a schematic illustration of system 8 for providing media content to end-users.

System 8 includes a receiver array 10 that is connected between HFC network 12 and Broadband Multimedia Router (BMR) 18. Receiver array 10 includes a plurality of receivers (not shown) for receiving RF signals representative of Transport stream signals, and converting the RF signals to DVB/ASI compliant signals. The conversion involves a down-conversion of RF signals to base band signals and performing de-modulation of the base band signals. It is noted that HFC network 12 conveys a plurality of RF signals within a relatively large frequency range. Usually, each receiver has a single tuner for receiving a single RF channel.

A data router, such as IP router 14, is connected between BMR 18 and a plurality of terminals 16_1–16_M, the terminals are collectively denoted 16. It is noted that IP router 14 can be connected to terminals 16 via a LAN or other kind of data oriented network of sub-network, but for simplicity of explanation the LAN is not illustrated. IP router 14 is operative to communicate with BMR 18 to determine a mapping between programs (or other types of media stream combinations) and IP addresses, for allowing or preventing a provision of a program to a terminal in response to a request initiated by the user of the terminal. Each terminal is operable, by means of hardware, software or a combination of both, to receive a stream of IP packets having a certain IP address, and to present images and/or to generate sound signals in response the media content embedded within the received IP packets. Terminals having software an/or hardware components for displaying audio/visual content in response to a reception of addressable media stream packets are well in the ability of the ordinary skilled artisan and so they need not described in detail here.

According to an aspect of the invention the IP addresses are multicast IP addresses (class D addresses) that allow for transmitting IP packets to a plurality of users. Each channel has a distinct IP multicast address. IP router 14 maintains a membership list for each IP multicast address, such that the members of a membership list receive IP packets that include said IP multicast address. The membership list can change dynamically, utilizing various protocols, such as IGMP group control protocol. It is noted that multicasting may be implemented by various manners, some being described at U.S. Pat. No. 5,983,005 of Moniteiro et al. that is hereby incorporated by reference.

It is noted that a single BMR, such as BMR 18 may be coupled to IP router 14 via a single port, or by a plurality of ports. Utilizing a plurality of ports increases the volume of transmitted signals between IP router 14 and BMR 18. When more than a single port of BMR 18 is coupled to a single IP router, such as IP router 14, BMR can allocate the media streams among these ports in response to various criteria, for example to achieve load balancing between the ports of BMR 18, to minimize the compression of media streams by stream processors 44_1–44_N, and the like.

According to an aspect of the invention BMR 18 is operable to output Ethernet compliant packets, each packet encapsulating Transport stream packets. Each Ethernet packet has an IP compliant address. The combination of Ethernet embedded address and output port allows for distinguishing between Transport packets of different programs. Accordingly, a PID re-stamping is not necessarily required.

Figure 2:
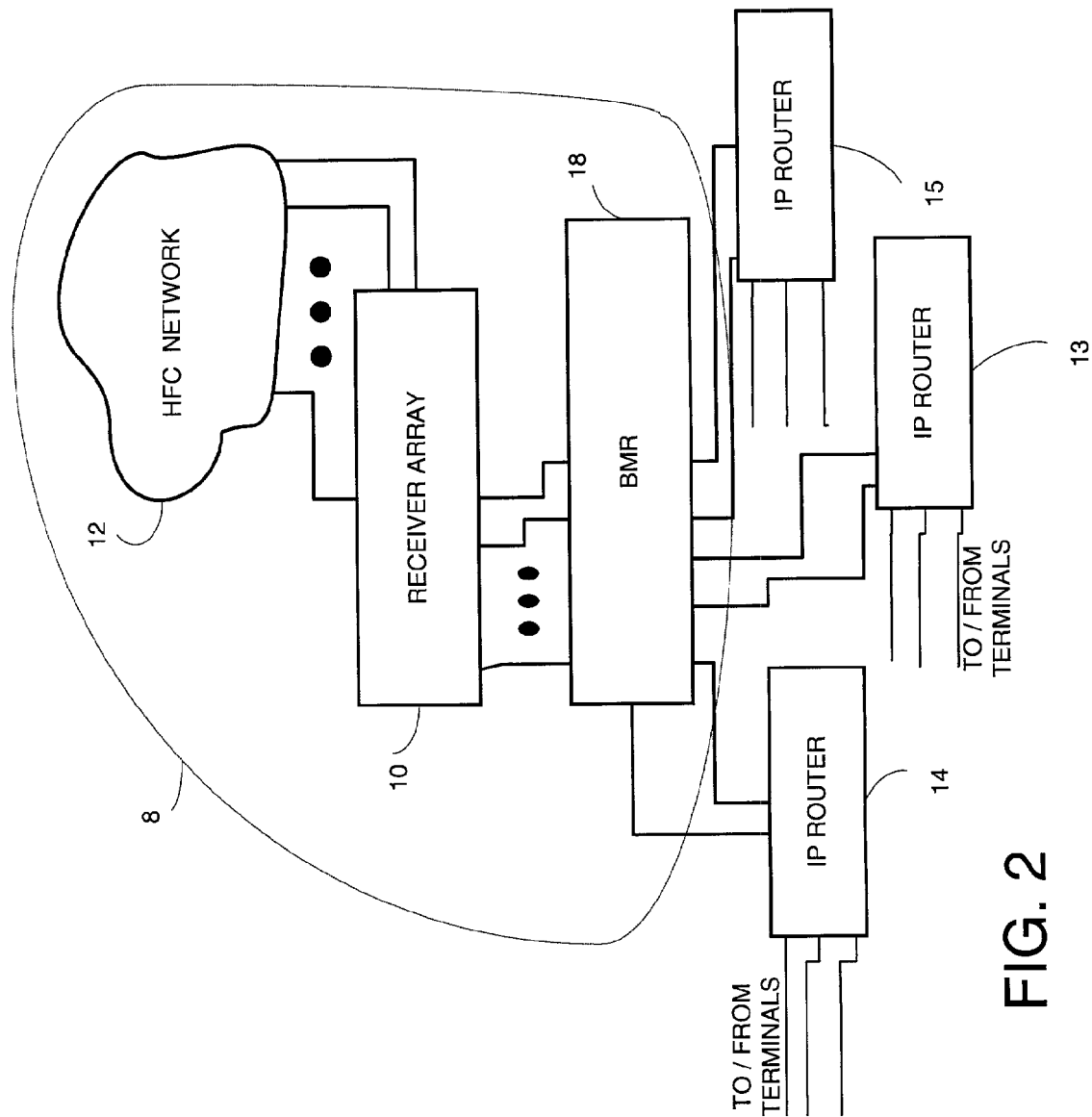

BMR 18 can be coupled to a single IP router but can also be coupled to a plurality of IP routers (or a plurality of data oriented networks, including LANs and the like). FIG. 2 illustrates a BMR 18 that is coupled to IP routers 14, 13 and 15. According to an aspect of the invention a BMR that is configured to be coupled to a plurality of networks may have a plurality of shared area managers, each for managing the communication with a single network. For example, BMR 18 of FIG. 2 may have three shared area managers, to manage the communication with IP routers 13, 14 and 15 accordingly and the terminals that are connected to these IP routers. Shared area managers are described at U.S. patent application Ser. No. 09/579,551 filed May 16, 2000.

According to another aspect of the invention, terminals 16 (via IP router 14) and even IP router 14 may provide BMR 18 with various transmission parameters, reflecting a status of IP router 14, terminals 16 and communication lines that interconnect between IP router 14, terminals 16 and BMR 18. Transmission parameters can include the processing capacity of each terminal, a required video quality, available bandwidth and the like. The transmission parameter and optionally the membership are of use when BMR determines whether to compress a media stream or to transmit it "as is".

Figure 3:
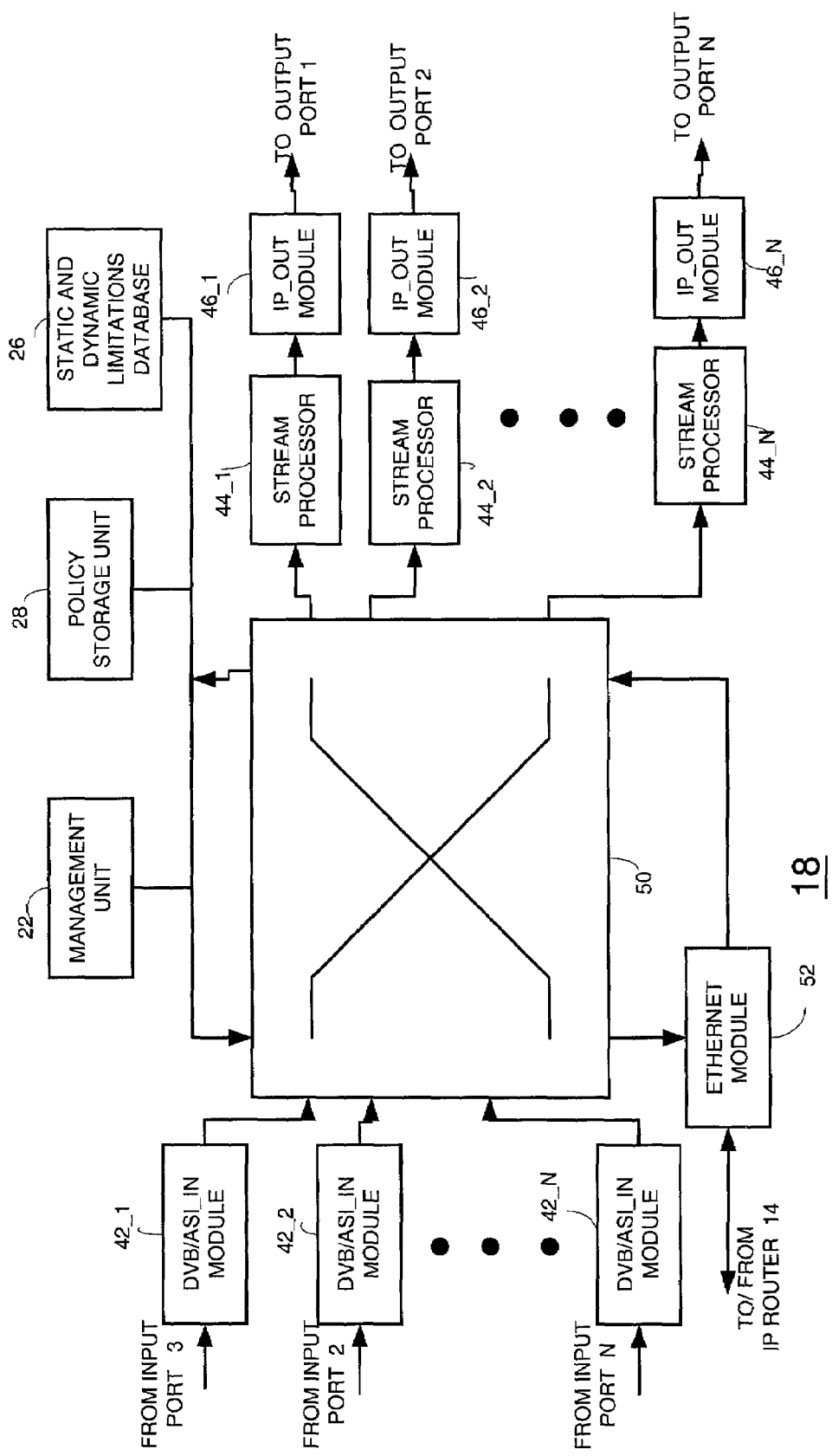
FIG. 3 is a schematic illustration of a Broadband Multimedia Router of the system of FIGS. 1 and 2, constructed and operative in accordance with an embodiment of the present invention.

Reference is now made to FIG. 3 which is a schematic illustration of broadband multimedia router (BMR) 18, constructed and operative in accordance with a preferred embodiment of the present invention.

BMR 18 includes multiport switch 50 connected to a plurality of DVB/ASI_IN modules 42_1–42_N (collectively denoted DVB/ASI_IN modules 42), Ethernet module 52, a plurality of stream processors 44_1–44_N (collectively denoted stream processors 44), management unit 22, transmission parameter storage unit 26 and policy storage unit 28. Each stream processor out of stream processors 44_1–44_N is coupled to an IP_OUT module out of IP_OUT modules 46_1–46_N.

BMR 18 is controlled by management unit 22. Management unit 22 controls the routing of packets received by DVB/ASI_IN modules 42, the processing of packets by said modules, the switching of packets across multiport switch 50, the processing of packets by stream processors 44 and by IP_OUT modules 46.

DVB/ASI_IN modules are well in the ability of the ordinary skilled artisan and so their structure need not described in detail here.

Figure 4:
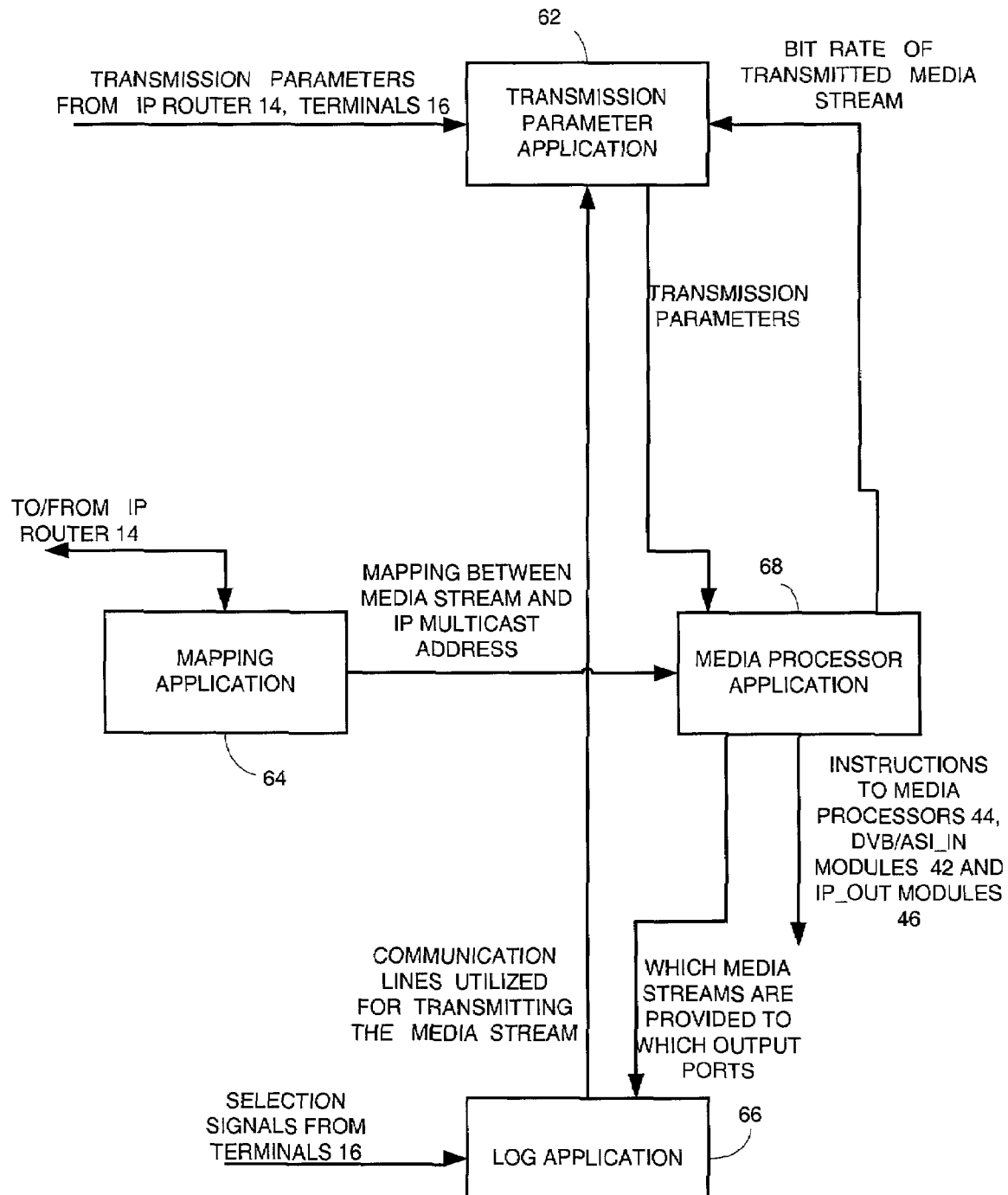
FIG. 4 is a schematic illustration of a management software architecture that allows the Broadband Multimedia Router of FIG. 3 to control the processing and transmission of received media packets.

FIG. 4 illustrates management software architecture 60 that allows BMR 18 to control the processing and transmission of received media packets.

Management software architecture 60 includes transmission parameter application 62, mapping application 64, log application 66, media processor application 68.

Transmission parameter application 62 is responsible for receiving transmission parameters from terminals 62 and/or IP router 14 and to provide an updated transmission database. Transmission parameter application 62 is also operative to calculate some transmission parameters in response to information provided by other software entities, such as log application 66 and media processor application 68. For example, if a certain media stream is sent, either in a compressed form or not, to a terminal, the bit rate of that media stream may be provided by media processor application 68 while the communication lines that is utilized for transmitting the media channel is provided by log application 66. It is noted that some of the transmission parameters, such as available bandwidth, may change quite frequently, while other transmission parameters, such as a maximal processing capacity of a terminal, may rarely change.

Mapping application 64 is responsible for mapping programs to IP multicast addresses. Usually, mapping application 64 and IP router 14 agree on the mapping prior to the provision of media streams to terminals 16, although the mapping can be done on the fly.

Log application 66 updates a log database that reflects which programs are viewed/received by which terminals. It is noted that a single terminal may receive more than a single channel, especially when the terminal is capable of multi-tasking, such as processors that are operative to work in a Windowed environment. Log application 66 may be further operative to process the log database to provide indication about end users viewing patterns, preferences and the like.

Media processor application 68 receives indication about the bit rate of incoming media streams, and communicates with transmission parameter application 62 and log application 66 to determine whether the received media streams may be transmitted or if they must be further compressed prior to the provision to terminals 16. Media processor application 68 is further responsible for routing incoming media packets across BMR 18. Media processor application 68 further converts non-addressable media packets to addressable packets, in response to the content of log database and the topology of BMR 18 and IP router 14, such that a router can route media packets of a program through BMR 18, IP router 14 to the terminal that requests to receive that program.

The following tables illustrate exemplary portions of a mapping database, a transmission parameter database, a log database and a media processor database, accessible to mapping application 64, transmission parameter application 62, log application 66 and media processor application 68, respectively.

TABLE 1

Mapping database

| Channel | IP multicast address |
|---|---|
| CNN | IP_multicast_address_1 |
| NBC | IP_multicast_address_2 |
| SKY news | IP_multicast_address_3 |
| Channel_m | IP_multicast_address_m |

TABLE 2

Transmission parameter database

| terminal # | Maximal processing capacity of the terminal | Maximal bit rate (bandwidth) of the communication line that couples the terminal to BMR | Available processing capacity of the terminal | Available bit rate (bandwidth) of the communication line that couples the terminal to BMR |
|---|---|---|---|---|
| 1 | 0.75 Mbps | 1.5 Mbps | 0.3 Mbps | 0.9 Mbps |
| 2 | 0.5 Mbps | 1.5 Mbps | 0.45 Mbps | 1.5 Mbps |
| 3 | 0.25 Mbps | 1.0 Mpbs | 0.22 Mbps | 0.2 Mbps |
| N | 0.75 Mbps | 1.0 Mpbs | 0.6 Mbps | 0.95 Mbps |

TABLE 3

Log database

| Terminal | Views channels |
|---|---|
| 1 | CNN |
| 2 | Sky news |
| 3 | NBC |
| N | None |

TABLE 4

Media processor database

| Channel | Bit rate | Output port |
|---|---|---|
| CNN | 0.4 Mbps | Output port 1 |
| NBC | 0.5 Mbps | Output port 1 |
| Sky news | 0.5 Mbps | Output port N |
| Channel m | 0.6 Mbps | Output port 2. |

Table 1 illustrates a mapping between m channels (CNN, NBC, Sky news . . . channel m) and IP multicast addresses (IP_multicast_address_1, . . . IP_multicast_address_m). Table 2 illustrates a transmission parameter database that reflects the maximal limitations of the processing power of each of n terminals 16 and the maximal bandwidth of the communication links that link terminals 16 to BMR 18, and the current available limitations. Table 3 illustrates the channels currently being received by each terminal of terminals 16. Table 4 illustrates selected channels, their bit rate and to which output port of BMR 18 each channel is to be routed. It is noted that "Mbps" is mega ($10^6$) bits per second.

It is noted that conventional MPEG transport stream packets do not include routing information such as destination or origin, rather just limited identification information, known as PID (Packet Identification). Furthermore, HFC network 12 may convey MPEG stream packets that are transmitted over distinct frequencies but have the same PID. The integrity of each media stream is maintained as long as the distinct media streams have distinct frequencies. The integrity may also be maintained if the distinct media streams are routed to through distinct paths across BMR 18 to be provided to distinct output ports of BMR 18.

According to an aspect of the invention a problem arises when the media streams are to be routed through the same path, as may occur when the distinct media streams are destined to the same output port of BMR 18 (as being indicated by media processor database). For example, if CNN and NBC are transmitted over HFC network with the same PID, but having distinct frequencies, the PID of either CNN or NBC must be changed, as both are destined to output port 1. In such a case there is a need to perform one of the following: (i) encapsulate the media packets within Ethernet compliant packet and assigning a distinct Ethernet address to packets that belong to distinct programs/are originated from distinct sources, (ii) perform a PID-re-stamping, to maintain the integrity of each media stream.

According to the disclosed technique, each packet that enters BMR 18 is either blocked or provided to an output port of BMR 18. A packet is blocked if it does not belong to a selected media stream out of a plurality of selected media streams. The selection can be responsive to various parameters, such as but not limited to end users requests, end users viewing patterns, end users profile, and the like. The selection is reflected by mapping database. Conveniently, mapping database stores selected channels only, although the mapping database can also include a larger list of channels, whereas each channel is associated with a selected/non-selected indication.

IP router 14 and BMR 18 agree on a set of selected media streams, and associate an IP multicast address to each selected media stream. A non-addressable packet that belongs to a selected media stream is encapsulated in an addressable packet, such that it may be switched across multiport switch 50 to a selected output port of BMR 18 to be provided to IP router 14. Conveniently, BMR 18 executes a dual stage conversion process, wherein during the first stage a non-addressable packet is associated with routing information to allow multiport switch 50 to provide it to the appropriate output port of BMR 18. During the second stage the routing information is replaced by the IP multicast address that is associated to the media stream to which the packet belongs.

It is noted that the transmission of a packet from BMR 18 to IP router 14 and the provision to a terminal may also be responsive to network polices, stored within policy database 28. When a packet is received, when a first packet out of media stream is received or when a request from a terminal to receive a media stream is detected, management unit 22 determines whether (a) to provide the packet, (b) to compress the media stream to which the packet belongs or (c) whether to block the received packet. The determination is responsive to network policy, dynamic and static limitations. The compression may be achieved by lossy and lossless techniques, such as transcoding and the like.

Management software architecture 60 may also include policy application 69 that checks whether a transmission of a media stream conforms to various network policies. It is noted that the policy application can be involved in the selection of selected channels, but this is not necessarily so. A network policy can virtually include any condition, which applies to the content, type, source, destination, network, and the like, which are involved in a transmission of a media stream. A network policy can include a condition, which does not allow X-rated movies to be transmitted to selected end-users, at predetermined hours of the day. A further example for a network policy can include a condition where a selected source can only provide services to selected users, and not to others, and the like.

BMR 18 is operative to direct a variety of packet types, even when a packet does not include destination address information. According to the present invention, BMR 18 makes sure that each entering packet, which does not include destination information, is assigned such information, if the packet belongs to a selected media stream, according to commands provided by the management unit 22.

DVB/ASI_IN modules 41_1 . . . 42_N are input ports, which receive MPEG transport packets. It is noted that an MPEG transport packet encapsulating elementary media, includes a stream ID, also called PID. Stream processors 44_1–44_N are operative to perform stream processing procedures such as multiplexing, re-multiplexing, rate adaptation, PID re-stamping, PCR re-stamping, updating system information embedded in transport streams, and the like. It is noted that the stream processors can be considered an integral part of BMR 18. It is further noted that some MPEG transport packets are timing information packets.

The following is an example for a complex routing situation, which is performed by BMR 18. DVB/ASI_IN module 42_1 receives three media streams $S_1$, $S_2$ and $S_3$, having PIDs of 50, 100 and 200, respectively. Media streams $S_1$, $S_2$ and $S_3$ are to be directed to IP_OUT modules 46_2, 46_2 and 46_1, respectively. Substantially, at the same time, DVB/ASI_IN module 42_2 receives four media streams $S_4$, $S_5$, $S_6$, $S_7$ and $S_8$ having PIDs of 100, 120, 200, 300 and 400 respectively. Media streams $S_1$–$S_7$ are selected while media stream $S_8$ is not selected. Accordingly, packets of media stream $S_8$ are blocked. Media streams $S_4$, $S_5$, $S_6$, and $S_7$ are to be directed to IP_OUT modules 42_2, 42_7 (not shown), 42_1 and 42_23 (not shown), respectively. In the present example, multiport switch 50 is a generic packet switching device and hence every packet provided thereto, has to be in a known addressable packet format. With respect to the media streams received at DVB/ASI_IN module 42_1, BMR 18 encapsulates a packet of media stream $S_1$, in an addressable packet, with destination information respective of the switch port, connected to IP_OUT module 44_2 and its original stream PID 50. Multiport switch 50 directs the produced addressable packet to IP_OUT module 44_2, which opens the encapsulation, reconstructs the media stream packet, and assigns the stream PID provided by BMR 18. It is noted that BMR 18 can provide a stream PID, which is different from the original stream PID of the packet, as will be described herein below.

BMR 18 encapsulates a packet of media stream $S_2$, in an addressable packet, with destination information respective of the switch port connected to IP_OUT module 44_2 and its original PID 100. BMR 18 encapsulates a packet of media stream $S_3$, in an addressable packet, with destination information respective of the switch port connected to IP_OUT module 44_1 and its original PID 200.

With respect to the media streams received at DVB/ASI_IN module 42_2, BMR 18 encapsulates a packet of media stream $S_4$, in an addressable packet, with destination information respective of the switch port connected to IP_OUT module 44_2 but assigns a new PID 150, since PID 100 is already used for IP_OUT module 44_2, by media stream S$_2$. Here, switch 274 directs the produced addressable packet to IP_OUT module 44_2, which opens the encapsulation, reconstructs the media stream packet, and assigns the stream PID (150) provided by BMR 18, which is different than the original stream PID (100). Similarly, BMR 18 encapsulates a packet of media stream S$_6$, in an addressable packet, with destination information respective of the switch port connected to IP_OUT module 44_1 but with a new PID 100, since PID 200 is already used for IP_OUT module 44_1 by media stream S$_3$. This procedure is called PID re-stamping.

BMR 18 encapsulates a packet of media streams S$_5$ and S$_7$, in addressable packets, with destination information respective of the switch port connected to IP_OUT modules 44_7 and 44_23, with their respective original PIDs 120 and 300.

Stream processors are also operable to process media streams in view of the transmission parameters. For example, assuming that media streams S$_1$, S$_2$ and S$_4$ have an aggregate bandwidth that exceeds the available bandwidth of at communication line that coupled output port 2 (coupled to IP_OUT module 44_2) then BMR 18 will check whether at least one of them can be provided to the same terminals through another output port. If the answer is yes packets from a least one media stream will be router to the other output port via multiport switch 50. Else, at least one media stream must be compressed, to allow the transmission of media streams S$_1$, S$_2$ and S$_4$ through the bandwidth limited communication line.

The above routing procedure is performed according to specific instruction provided by the management unit 20, for example, by means of a routing table. In case of an MPEG transport packet, BMR 18 accesses the routing table according to the stream PID of that packet, and the DVB/ASI_IN module identification, which was received, and retrieves the predetermined destination associated therewith. It is noted that the predetermined destination is respective of the combination of the packet stream PID, and the respective DVB/ASI_IN module identification.

A data packet received from Ethernet module 52, is typically an addressable packet and hence already contains destination information. This data packet can be directed to a respective output port of the switch, according to that destination information. It is noted that management unit 20 can instruct BMR 18, for example, by means of a routing table, to direct addressable packets to predetermined ports, which are set to be different but according to the destination information embedded in the packet. For example, addressable packets received from (to) IP router 14 are usually provided to (from) communication bus 21 that is coupled to management unit 22, policy storage unit 28 and transmission parameter storage unit 26.

BMR 18 is further operative to perform various stream processing procedures such as multiplexing, re-multiplexing, rate adaptation, PID re-stamping, PCR re-stamping (e.g., jitter reduction procedure by updating the program clock reference fields), updating system information embedded in transport streams, and the like. Such stream processing procedures are usually carried in an outgoing route of BMR 18 (e.g., either in multiport switch 50, in one of the output modules 46_1–46_N, or in the route there between, by specific modules). In the present example, each of the IP_OUT modules 46 is also operative to encapsulate other types of data in IP format, perform statistical multiplexing, and stream rate adaptation, to adapt the bandwidth and quality of the media stream to the available network resources.

Figure 5:
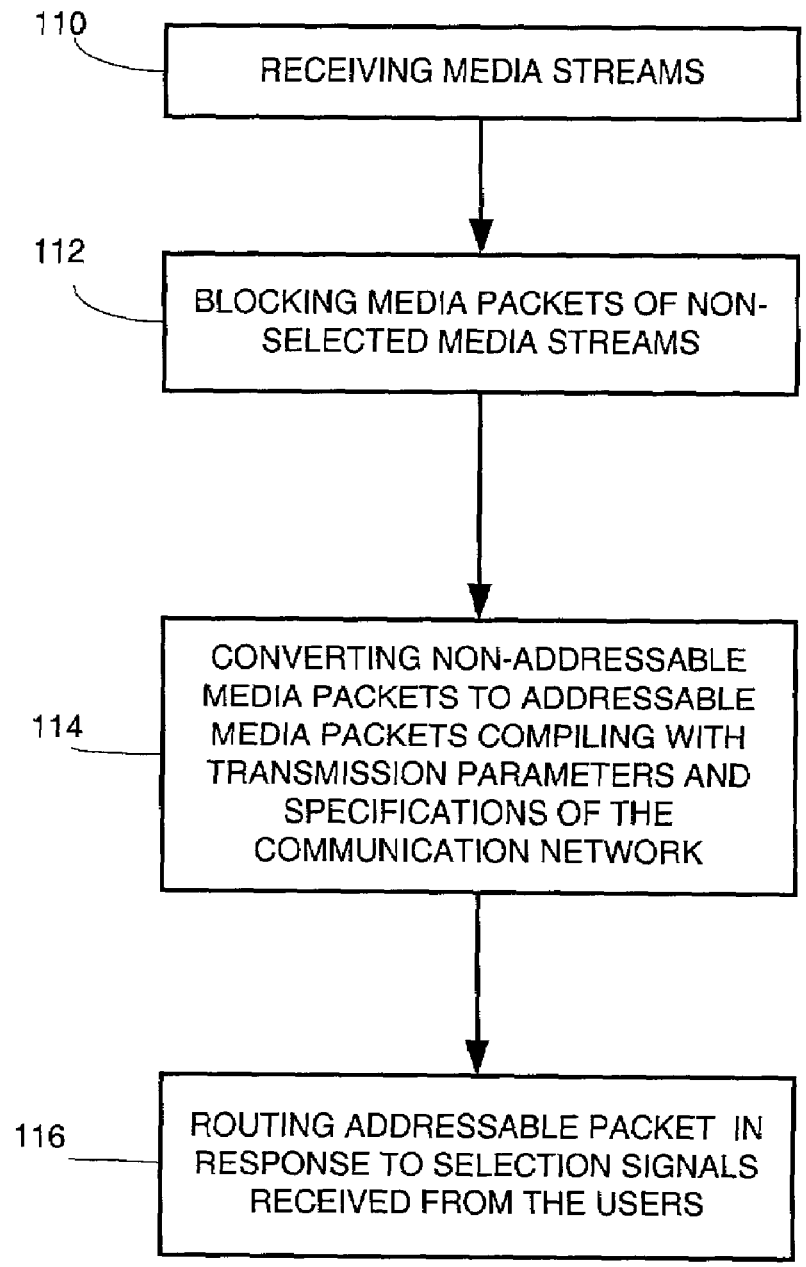
FIG. 5 is an illustration of a method for operating the Broadband Multimedia Router of FIG. 3, operative in accordance with a further embodiment of the present invention.

Reference is now made to FIG. 5, which is an illustration of method 100 for operating BMR 18, operative in accordance with another preferred embodiment of the present invention.

Method 100 starts at step 110 in which a plurality of media streams are received from a plurality of input ports, where each media stream includes a plurality of media packets. These media streams can include video streams, audio streams, data streams and the like. With reference to FIG. 2, DVB/ASI_IN modules 42_1–42_N receive a plurality of media streams from HFC network 12.

Conveniently, the media streams that are received from the HFC network are non-addressable, but this is not necessarily so and at least some of the media streams can be addressable. An addressable media stream includes specific destination information, which is typically embedded in each of its packets, such as in IP packet, Ethernet packet, and the like. Such destination information is used to direct each packet to the final destination, and do so at different routes for each packet. A non-addressable media stream does not include specific destination information. A non-addressable media stream can be an MPEG transport elementary stream, which only includes a packet identification code, indicating that the stream packets belong to the same stream.

Step 110 is followed by step 112 of blocking media packets of non-selected media streams. Referring to FIG. 4, non-addressable media streams are identified by their packet identification code and the input port and/or receiver from which they were received. After the identity of a media stream is determined mapping application 64 is accessed to determine whether the media stream is selected—i.e.— whether the media stream has an IP multicast address. If the answer is 'no' the packets of that media stream are blocked. Addressable media streams are identified either by the routing information embedded within the stream or by their packet identification code and the input port and/or receiver from which they were received. It is noted that addressable media streams may also be blocked or further routed, in response to various criteria, such as their routing information.

Step 112 is followed by step 114 of converting non-addressable media packets of selected media streams to addressable media packets complying with transmission parameters and with specifications of the communication network protocol. If a non-addressable media stream belongs to a selected media stream it is temporarily converted into an addressable media stream packet, which hence, can be directed. The destination address is provided by the management unit 20, and is retrieved momentarily according to the packet stream identification, and according to the identification of the input port, which received it. It is noted that a packet can have more than one destination address. This is known as multicast.

In step 114, the bandwidth and quality of selected media streams are adapted to meet the available network resources and other transmission parameters and the stream is processed according to selected stream processing procedures, such as multiplexing, re-multiplexing, rate adaptation, PID re-stamping, PCR re-stamping, updating system information embedded in transport streams, and the like. With reference to FIG. 3, these operations are performed by IP_OUT modules 46 and stream processors 44.

Step 114 is followed by step 116 of routing the addressable media packets in response to selection signals received from the users.

It is noted that the method and apparatus according to the present invention can be implemented either in hardware, in software or in a combination thereof.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

The invention claimed is:

1. A method for providing media packets to users coupled to a communication network having a communication network protocol, the method comprising:
   receiving non-addressable media packets;
   blocking media packets of non-selected media streams;
   converting non-addressable media packets of selected media streams to addressable media packets complying with transmission parameters and specifications of the communication network protocol by, first, associating the non-addressable media packets of the selected media streams with routing information to allow switching of the media packets to appropriate output ports of a routing apparatus, and, second, replacing the routing information with respective Internet protocol multicast addresses associated with the selected media streams to which the media packets belong; and
   routing the addressable media packets in response to selection signals received from the end users.

2. The method of claim 1 wherein the transmission parameters reflect an available bandwidth for transmitting the addressable media packets to the users.

3. The method of claim 1 wherein the transmission parameters reflect an available processing capacity of the users.

4. The method of claim 1 wherein converting comprises compressing the media packets in response to the transmission parameters.

5. The method of claim 1 wherein routing comprises allowing multicast transmission of the media packets.

6. The method of claim 1 wherein the specifications of the communication network protocol define a format of the addressable media packets.

7. The method of claim 1 wherein the communication network protocol is selected from a group of protocols consisting of: TCP/IP, and UDP/IP.

8. The method of claim 1 wherein receiving comprises receiving RF signals representative of the non-addressable media packets and down-converting the RF signals to base band signals.

9. The method of claim 8 wherein down-converting the RF signals is followed by de-modulating the base band signals.

10. The method of claim 1 wherein converting comprises at least one step selected from the group consisting of: multiplexing; re-multiplexing; rate adaptation; PID re-stamping; PCR re-stamping; and updating system information embedded in transport streams.

11. The method of claim 1 further comprising processing the addressable media packets to display visual content embedded within the addressable media packets.

12. The method of claim 1 further comprising receiving, in addition to the non-addressable media packets and at the routing apparatus, addressable packets and routing the addressable packets in response to routing information embedded within the addressable packets.

13. A method for displaying audio visual content to end-users, the method comprising:
   receiving media stream packets from a cable communication network;
   converting the received media stream packets to local area network compliant packets by, first, associating the media stream packets with routing information to allow switching of the media stream packets to appropriate output ports of a routing apparatus, and, second, replacing the routing information with Internet protocol address information associated with media streams to which the media stream packets belong; and
   providing the local area network compliant packets to the end-users coupled to a local area network in response to selection signals received from the end-users.

14. The method of claim 13 further comprising receiving, at the routing apparatus, data packets from a non-cable communication network and providing the data packets to the end-users.

15. The method of claim 13 further comprising processing the local area network compliant packets to display visual content embedded within the local area network compliant packets.

16. The method of claim 13 wherein converting comprises adjusting the media stream packets to comply with transmission parameters of the local area network.

17. The method of claim 16 wherein the transmission parameters reflect an available bandwidth for transmitting the local area network compliant packets to the end-users.

18. The method of claim 16 wherein the transmission parameters reflect an available processing capacity of the end-users.

19. The method of claim 15 wherein converting comprises compressing the media stream packets in response to transmission parameters of the local area network.

20. The method of claim 13 wherein converting comprises at least one step selected from the group consisting of: multiplexing; re-multiplexing; rate adaptation; PID re-stamping; PCR re-stamping; and updating system information embedded in transport streams.

21. A system for providing media packets to users, the system comprising:
   a receiver array for converting RF signals representative of media packets to non-addressable media packets; and
   a broadband multimedia router, coupled between the receiver array and a communication network having a communication network protocol, and configured for selectively converting non-addressable media packets of selected media streams to addressable media packets complying with transmission parameters and specifications of the communication network protocol by, first, associating the non-addressable media packets with routing information to allow switching of the media packets to appropriate output ports of the broadband multimedia router, and, second, replacing the routing information with Internet protocol address information associated with the selected media streams to which the media stream packets belong, and routing the addressable media packets over the communication network in response to selection signals received from the users.

22. The system of claim 21 wherein the transmission parameters reflect an available bandwidth for transmitting the addressable media packets to the users.

23. The system of claim 21 wherein the transmission parameters reflect an available processing capacity of the users.

24. The system of claim 21 wherein the broadband multimedia router is operable to compress the media packets in response to the transmission parameters.

25. The system of claim 21 wherein the addressable media packets are multicast over the communication network.

26. The system of claim 21 wherein the specifications of the communication network protocol define a format of the addressable media packets.

27. The system of claim 21 wherein the communication network protocol is selected from a group of protocols consisting of: TCP/IP, and UDP/IP.

28. The system of claim 21 wherein the broadband multimedia router is operable to implement at least one step selected from the group consisting of: multiplexing; re-multiplexing; rate adaptation; PID re-stamping; PCR re-stamping; and updating system information embedded in transport streams.

* * * * *